(12) United States Patent
Perrin

(10) Patent No.: US 9,901,822 B2
(45) Date of Patent: Feb. 27, 2018

(54) VIDEO GAMING DEVICE WITH REMOTE RENDERING CAPABILITY

(71) Applicant: SQUARE ENIX HOLDINGS CO., LTD., Tokyo (JP)

(72) Inventor: Cyril Perrin, Antony (FR)

(73) Assignee: SQUARE ENIX HOLDING CO., LTD., Tokyo (JP)

( * ) Notice: Subject to any disclaimer, the term of this patent is extended or adjusted under 35 U.S.C. 154(b) by 247 days.

(21) Appl. No.: 14/366,444

(22) PCT Filed: Jan. 9, 2014

(86) PCT No.: PCT/JP2014/050727
§ 371 (c)(1),
(2) Date: Jun. 18, 2014

(87) PCT Pub. No.: WO2015/104849
PCT Pub. Date: Jul. 16, 2015

(65) Prior Publication Data
US 2015/0251095 A1 Sep. 10, 2015

(51) Int. Cl.
| A63F 9/00 | (2006.01) |
| A63F 13/50 | (2014.01) |
| G06T 15/00 | (2011.01) |
| A63F 13/86 | (2014.01) |
| A63F 13/335 | (2014.01) |
(Continued)

(52) U.S. Cl.
CPC .............. *A63F 13/50* (2014.09); *A63F 13/30* (2014.09); *A63F 13/335* (2014.09); *A63F 13/352* (2014.09); *A63F 13/86* (2014.09);
*G06F 3/048* (2013.01); *G06F 9/4445* (2013.01); *G06T 15/005* (2013.01); *G06T 2200/16* (2013.01)

(58) Field of Classification Search
None
See application file for complete search history.

(56) References Cited

U.S. PATENT DOCUMENTS

| 7,632,186 B2 | 12/2009 | Spanton et al. |
| 2007/0117635 A1 | 5/2007 | Spanton et al. |
(Continued)

FOREIGN PATENT DOCUMENTS

| GB | 2447020 | 9/2008 |
| JP | 2006-101329 | 4/2006 |
(Continued)

OTHER PUBLICATIONS

International Search Report (ISR) in International Patent Application No. PCT/JP2014/050727, dated Feb. 18, 2014.
(Continued)

*Primary Examiner* — Seng H Lim
(74) *Attorney, Agent, or Firm* — Greenblum & Bernstein, P.L.C.

(57) ABSTRACT

A gaming device for playing a video game. The gaming device executes game software to output rendering commands representing a virtual world of the video game and has a local rendering module for processing the rendering commands to generate an image data stream of the virtual world. The gaming device has a remote rendering controller for generating second rendering commands for processing by a remote rendering module to generate a rendered graphics output also depicting the virtual world.

20 Claims, 5 Drawing Sheets

(51) Int. Cl.
*A63F 13/352* (2014.01)
*G06F 3/048* (2013.01)
*A63F 13/30* (2014.01)
*G06F 9/44* (2018.01)

(56) References Cited

U.S. PATENT DOCUMENTS

| | | |
|---|---|---|
| 2008/0139301 A1 | 6/2008 | Holthe |
| 2008/0268961 A1 | 10/2008 | Brook et al. |
| 2009/0080523 A1 | 3/2009 | McDowell |
| 2009/0209348 A1 | 8/2009 | Roberts et al. |
| 2009/0253506 A1 | 10/2009 | Ishii et al. |
| 2010/0035691 A1 | 2/2010 | Wild et al. |
| 2011/0191686 A1* | 8/2011 | Wolff-Petersen ..... G06F 15/177 715/735 |
| 2011/0281645 A1 | 11/2011 | Wolfson et al. |
| 2012/0069036 A1 | 3/2012 | Dharmapurikar |
| 2013/0104044 A1* | 4/2013 | Gujarathi ............. G06F 9/4445 715/733 |
| 2013/0159375 A1* | 6/2013 | Perry .................... H04L 67/02 709/201 |
| 2013/0210522 A1 | 8/2013 | Dharmapurikar |
| 2014/0080601 A1* | 3/2014 | Knutsson ................ A63F 13/12 463/31 |
| 2014/0181675 A1* | 6/2014 | Suzuki .................. G06F 9/4443 715/733 |
| 2014/0282169 A1* | 9/2014 | Mahmood ............ G06Q 10/063 715/771 |
| 2015/0011313 A1* | 1/2015 | Ikenaga ................. A63F 13/12 463/31 |

FOREIGN PATENT DOCUMENTS

| | | |
|---|---|---|
| JP | 2007-079664 | 3/2007 |
| WO | 2013/128709 | 9/2013 |

OTHER PUBLICATIONS

European Search Report from European Patent Office (EPO) in European Patent Appl. No. 14877626.3, dated Nov. 8, 2017.

* cited by examiner bg # VIDEO GAMING DEVICE WITH REMOTE RENDERING CAPABILITY

FIELD OF THE INVENTION

The invention relates to a video gaming device that interfaces with a remote rendering server to perform image rendering. The invention also relates to a server arrangement that performs image rendering functions under control of the remote video gaming device. The invention also relates to various methods and devices for performing remote rendering operations in the context of video gaming.

BACKGROUND OF THE INVENTION

Many video games today allow spectating, which is the ability of a participant to view the game action without directly being involved in it.

Spectating an online video game that is being run over a private network requires the spectator to invest in gaming equipment that can interface with the other gaming devices connected to the private network. This means that a spectator can watch the game only through the intermediary of a gaming device running the same game software that would be required to directly participate in the game. This is obviously a disadvantage in that it limits access, from a spectating point of view, to online games.

Therefore, there is a need to develop improved gaming devices and associated systems and techniques for facilitating access to spectators to video game action.

SUMMARY OF THE INVENTION

As embodied and broadly described herein, the invention provides a gaming device for playing a video game. The gaming device executes game software to produce first rendering commands representing a virtual world of the video game and a local rendering module for processing the rendering commands to generate an image data stream of the virtual world. The gaming device also has a remote rendering controller for generating second rendering commands for processing by a remote rendering module to generate a rendered graphics output also depicting the virtual world. An output releases the image data stream and transmits the second rendering commands to a data communication network for transmission to the remote rendering module.

As embodied and broadly described herein, the invention also provides a server arrangement for performing remote rendering of video game graphics. The server arrangement receives rendering commands transmitted to the server input over a data network from a remote location, the rendering commands representing a virtual world of a video game, the video game being played by players controlling respective virtual characters in the virtual world. The server arrangement also receives identification information to identify one or more spectators. The server arrangement has a rendering module for processing the rendering commands to generate an image data stream depicting the virtual world and an output for transmitting the image data stream to the one or more spectators over a data network.

As embodied and broadly described herein, the invention further provides a method for allowing a spectator to spectate an online video game played over a network. The method including executing by a Central Processing Unit (CPU) game software to generate rendering commands representing a virtual world of a video game, processing the rendering commands with a rendering module to generate an image data stream and outputting the image data stream to a display device. The method also includes processing with the CPU the first rendering commands to derive second rendering commands and transmitting the second rendering commands to a remote server for rendering and delivery of a rendered output to at least one spectator.

As embodied and broadly described herein, the invention also provides a method for performing distributed rendering of a video game. The method including processing with a first rendering module at a first network node in a data network rendering commands representing a virtual world of a video game to generate an image data stream for display to a player that controls a virtual character in the video game. The method also includes processing at a second node in the data network that is remote from the first node second rendering commands derived from the first rendering commands with a second rendering module to produce a rendered output depicting the virtual world and the virtual character of the player and transmitting the rendered output to at least one spectator for viewing.

As embodied and broadly described herein, the invention further includes a machine readable storage medium encoded with non transitory program code for execution by a CPU for generating rendering commands to perform remote rendering of video game scenes, the program code including remote rendering program instructions for processing first rendering commands output by game software for driving a local rendering module, to derive second rendering commands for processing by a remote rendering module to generate an image data stream of the video game scenes. The program code also includes program instructions for transmitting the second rendering commands to a remote rendering module over a data network.

DESCRIPTION OF AN EXAMPLE IMPLEMENTATION OF THE INVENTION

In a specific and non-limiting example of implementation, the invention provides a gaming device that outputs rendering commands that are rendered remotely. The rendered output is available to spectators that wish to observe the game action.

Figure 1:
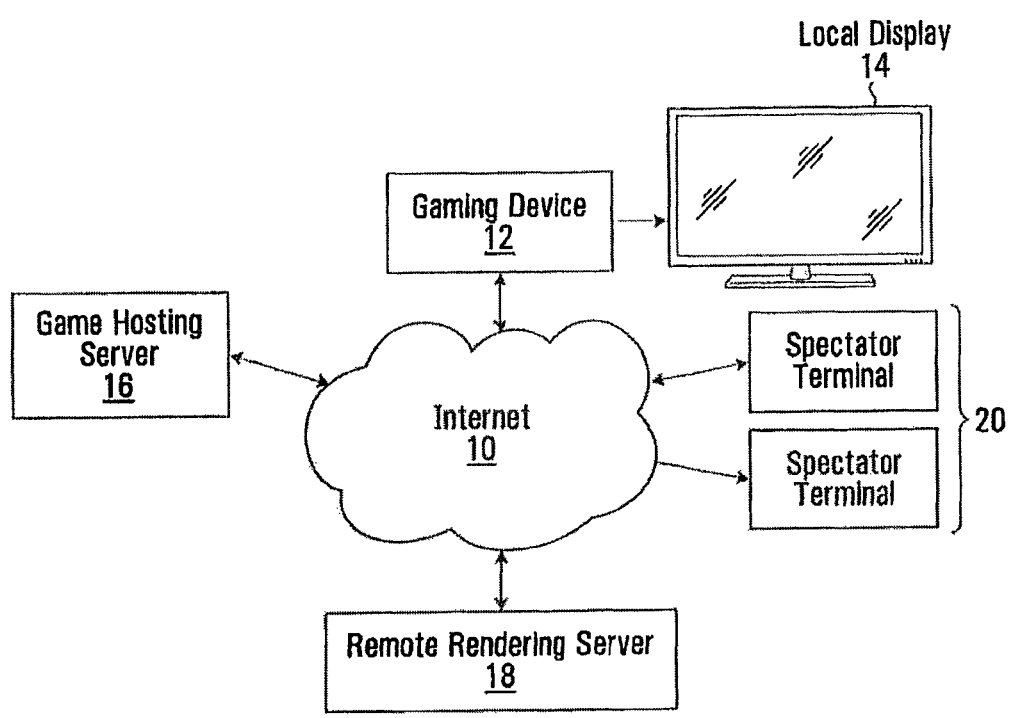
FIG. 1 is a block diagram illustrating a data network and the various network nodes collectively implementing an online video game infrastructure, according to a non-limiting example of implementation of the invention.

FIG. 1 illustrates the data communication infrastructure allowing playing the video game and also providing spectators with access to the video game action. The data communication infrastructure includes a data network 10 such as the Internet that can be used to exchange data between nodes of that network. A gaming device 12, which constitutes an individual node of the data network 10, allows a local player to play a video game. The video game is an online video game, in other words, other players at remote gaming devices also participate in the game. Such multi-player gaming action is generally considered to provide a superior game experience than a single gamer action. Alternatively, the video game is a single player game.

The gaming device 12 outputs image data to a local display 14, such as a television set. The local display 14 shows to the local player images of the virtual world in which the virtual game character of the player evolves. While not shown in the drawings, it is to be understood that the local player interacts with the video game through controls such as game pads or any other suitable device allowing the requisite degree of player input. Such game pads allow the player to control the movement of the virtual game character, change the settings of the gaming device and optionally specify the address or identity of a spectator that is to receive the gaming action stream.

When the online video game is being played, the gaming device sends game metrics to a game-hosting server 16. The game-hosting server 16 receives the game metrics from all the gaming devices involved in the game, aggregates them and broadcasts them back to the individual gaming devices 12. In this fashion, the gaming device 12 can generate the interactive, multiplayer virtual environment.

As the game is being played, the gaming device 12 generates rendering commands that are transmitted to a remote rendering server 18. The rendering commands constitute a representation of the virtual world of the game and they are used as input to a rendering module at the remote rendering server 18. The rendering module processes the rendering commands and generates an image data stream that is transmitted through the data network 10 to spectators 20.

The above-described architecture is useful and beneficial in the sense that it does not require the individual spectators to be involved in any way in the exchange of game metrics required when a participant is actively involved in the game and controls a virtual game character. Spectators only need to connect to the remote rendering server 18 to access the image data stream conveying the video game action.

The gaming device 12 is based on a computer platform that is generically illustrated in FIG. 1. The computer platform has a Central Processing Unit (CPU) 22 (in practice, multiple CPUs can be used to increase the processing power), a machine-readable storage 24 which is more commonly referred to as "memory", a Graphics Processing Unit (GPU) 26 and an input/output interface 28.

These components are interconnected by a data bus 30 over which data and other signals are exchanged.

The memory 24 globally refers to both volatile and non-volatile storage used for storing program instructions and data on which the program instructions operate. In practice, the memory 24 could be of distributed nature and could include multiple components that may be located at a single node or can be at several different nodes of the network.

The GPU 26 is a hardware accelerator that increases image rendering performance. As it is well known to those skilled in the art, the GPU is a specialized processor that can perform image processing functions more efficiently and rapidly than a general purpose CPU.

The input/output interface 28 refers globally to the various hardware and software components allowing exchange of data with external devices. For example, signals that convey player commands generated by the game pads are directed to the CPU through the input/output interface 28. Similarly, signals and data generated by the internal processing are output and directed to external devices through the input/output interface 28.

Figure 2:
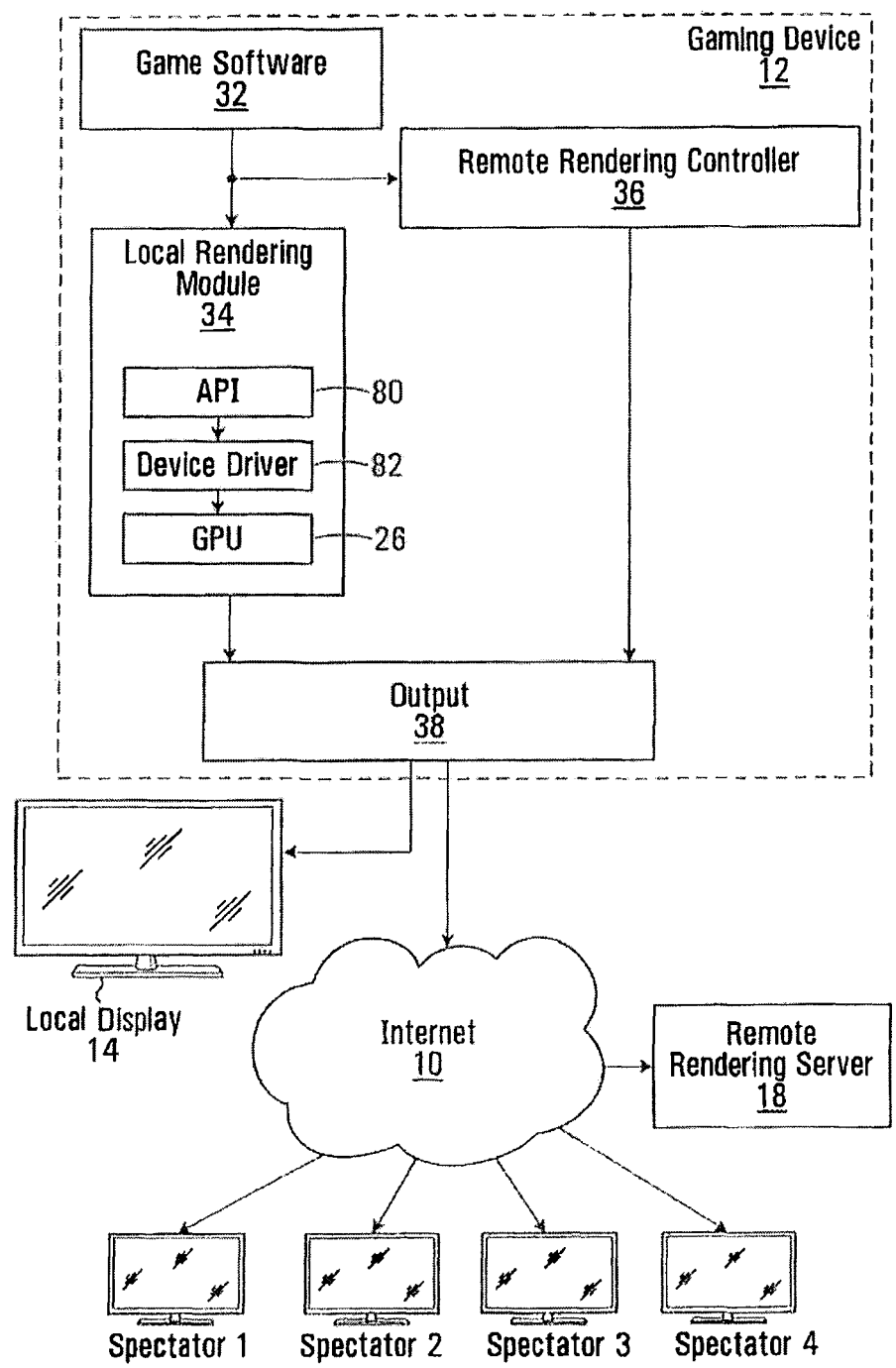
FIG. 2 is a more detailed block diagram of the gaming device shown in FIG. 1, illustrating the various functional modules of the gaming device and their relationship to some external components.
Figure 3:
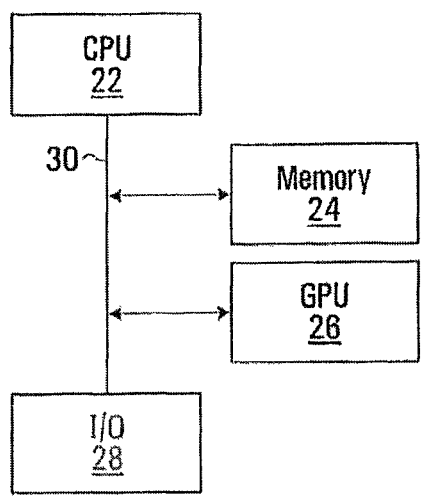
FIG. 3 is a block diagram of a computing platform on which the gaming device shown in FIGS. 1 and 2 is implemented.

FIG. 2 illustrates in greater detail the internal structure of the gaming device 12. Note that the internal representation provided is a blend of hardware and software intended to illustrate functional modules rather than specific hardware components.

The gaming device 12 has a game software 32 that implements the game logic as a result of execution of game software 32 by the CPU 22. The game logic runs according to player inputs, in particular those of the local player at the game pads and also inputs from players at remote gaming devices. It is beyond the scope of this specification to discuss the particulars of the game software 32 as it is highly dependent on the game scenario, game type etc. Suffice it to say that the execution of the game software 32 outputs data that is supplied to a rendering module to generate the images of the virtual world that are displayed to the local player on the display 14. In addition, the execution of the game software 32 generates game metrics, which describe the actions of the virtual character controlled by the local player. Examples of game metrics include the location of the virtual player in the game map, its direction and speed of movement, actions by the player such as firing a weapon, using a particular tool to achieve a certain task, body postures, specific character settings such as weapons inventory and degree of health remaining, among others.

The game metrics are output by the gaming device 12 and sent to the game hosting server 16 which aggregates them and broadcasts them back to the individual gaming devices 12. In this fashion, each gaming device has access to the game metrics of other players in order to create a complete representation of the virtual world and its action including not only the game character controlled by the local player but also the game characters controlled by the remote players.

The gaming device 12 further includes a local rendering module 34, which receives from the game software 32 the data describing the virtual world of the game and the action. This data, also referred to as "rendering commands" includes instructions telling the local rendering module 34 how to process geometry information, which provides a mathematical representation of the objects making up the virtual world scenes and game characters, in order to generate a visible image that can be displayed to the local player. In a specific form of implementation, the output of the local rendering module 34 is an image data stream that can be fed to a television set or to a video monitor for display. The image data stream can be a succession of still image frames. Alternatively the image data stream can be organized to provide information on movements, such as for example a video stream encoded according to the h264 standard for video compression.

A remote rendering controller 36 is provided to generate the rendering commands for driving the remote rendering server 18. The remote rendering controller 36, which can be implemented in software. Intercepts the rendering commands output as a result of execution of the game software 32 and converts them in a format suitable for transmission and processing by the remote rendering server 18. Note that the processing of the intercepted rendering commands may be minimal or extensive.

For example, the remote rendering controller 36 may simply packetize the intercepted rendering commands for transmission to the remote rendering server 18 through the data network 10. In this case, the rendering commands that are delivered at the remote rendering server 18 (after re-assembly) are essentially identical to the rendering commands that are input in the local rendering module 34.

In another form of implementation, the remote rendering controller 36 will, in addition to packetizing the data, encode it for more efficient transmission. Different types of encoding can be contemplated according to the intended application. In such instance, the remote rendering controller 36 is provided with a suitable encoder that can be hardware- or software-implemented. As a corollary to the encoder, a complementary decoding function will also be required at the remote rendering server 18.

In a specific and non-limiting example of implementation, the remote rendering controller 36 collects all the rendering commands produced by the game software 32 in one frame (typically 33 ms) and sends those commands to the remote rendering server 18 for execution. In this fashion, the rendering commands are being effectively sent to the remote rendering server 18 in batches, where each batch contains image data for a single still image.

In addition to the generation of the rendering commands for processing by the remote rendering server 18, the remote rendering controller 36 can also output spectator identifiers, to identify one or more spectators that are to receive the game action stream, as it will be discussed in greater detail later.

The gaming device 12 also has an output 38 that releases the various data streams internally generated, to external devices. For instance, the output of the local rendering module 34, which is the image data stream, is released from the output to the local display 14. In a specific form of implementation, the image stream can be encoded into the well-known HDMI format that includes both video and audio sub-components. Evidently, other formats can also be used without departing from the spirit of this invention.

The rendering commands generated by the remote rendering controller 36 are also released through the output 38. In this instance, the output connects to the Internet such that the rendering commands can be transmitted to the remote rendering server 18. In this example, the output 38 has the necessary data transmission functions such that it can interface with the data network 10.

As it will be apparent to the reader skilled in the art, the output 38 is not necessarily a dedicated software or hardware function, rather it represents the overall functionality allowing the various signals that are generated internally to be released to external devices. Accordingly, the structure of the output 38 may be of distributed nature and components thereof may be integrated in other functions or modules of the gaming device 12. For example, the output function as it relates to the image stream released from the local rendering module 34 may be integrated into the local rendering module 34 that could, in addition to performing the image rendering operation, encode the rendered output in the HDMI format.

Similarly, the rendering commands transmission function can be integrated into the remote rendering controller 36 that could in addition to performing the data processing on the rendering commands, encode them and then packetize the encoded output in a format suitable for transmission to the data network 10.

Although not shown in the drawings, the gaming device 12 would also include an input function through which external signals are channeled for internal processing. An example of such external signals would be the control signals generated by the game pads on which the player inputs commands to control the movements and actions of the virtual character.

Figure 4:
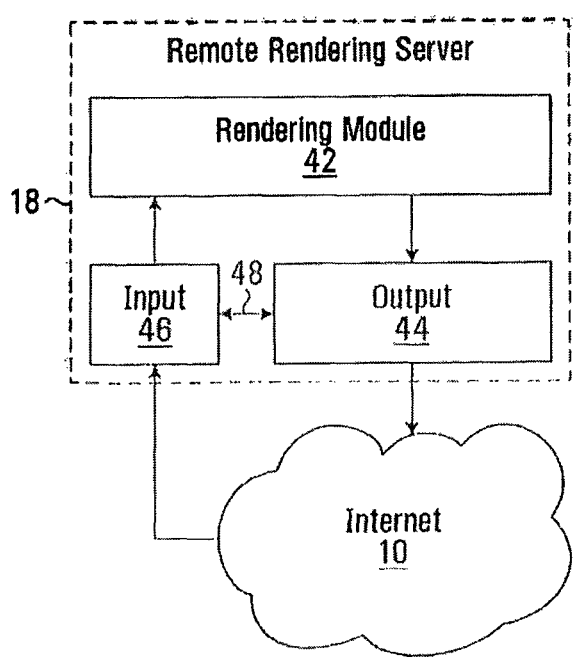
FIG. 4 is a block diagram illustrating in greater detail the structure of the remote rendering server shown in FIGS. 1 and 2.

FIG. 4 is a more detailed block diagram of the remote rendering server 18 shown in FIGS. 1 and 2. The remote rendering server 18 includes a rendering module 42 for performing image rendering on the rendering commands received from the gaming device 12. The remote rendering module 42 is based on a GPU (not shown) to more efficiently perform the image rendering operation. In a specific example, the remote rendering module 42 can be the same as the local rendering module 34 in the gaming device 12. However, this is not necessary in all cases as implementations are possible where a different rendering module may be used. For instance, the rendering module 42 may be designed such as to output the image stream in a different format that is better suited for video streaming over the Internet.

The MPEG-4 is an example of such format. Furthermore, the rendering module 42 can be specifically designed according to the resolution or simply the type of displays on which the spectators will be watching the game action and that can be significantly different from the display connected to directly integrated into the gaming device 12. For example, the rendering module 42 can be optimized to generate an image data stream adapted for mobile devices, instead of larger displays of the type that the gaming device 12 would normally connect to.

The rendered image data stream generated by the rendering module 42 is transmitted to various spectators through an output 44. The output 44, which broadly designates an output function of the remote rendering server 18, performs a number of tasks such as managing the list of spectators, which are to receive the image data stream, among others. The spectator management function would require maintaining a list of the IP addresses of the spectators that are to receive the image data stream. Accordingly, the image data stream received from the rendering module 42 is broadcast to the IP addresses in the list of spectators.

The remote rendering server 18 also has an input 46 connecting to the Internet that receives the rendering commands generated by the gaming device 12. Accordingly, the rendering commands transmitted from the gaming device 12 are received at the input 46, pre-processed and supplied to the rendering module 42. In its simplest form, the pre-processing function would include re-assembling the data extracted from the packets to produce a continuous and coherent data stream that the rendering module 42 can process. If the gaming device 12 encodes the rendering commands, the input 46 would then apply a suitable decoding function before supplying the rendering commands to the rendering module 42.

Under the optional scenario where the gaming device 12, in addition to generating the rendering commands, also generates one or more identifiers of the spectators that are to receive the rendered output, those identifiers would also be received by the remote rendering server 18 through the input 46. The identifiers of the spectators can be the IP addresses of the terminals at which the spectators would be watching the game action. Those IP addresses can be passed to the IP address list maintained by the output 44. This communication function is shown by the arrow 48.

Figure 5:
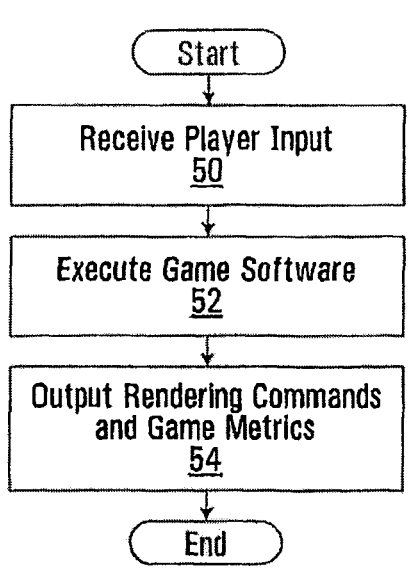
FIG. 5 is a flowchart illustrating a process that is performed during execution of the game software by the gaming device shown in FIGS. 1 and 2.

FIG. 5 is a flowchart illustrating the various steps of the process during execution of the game software 32. The process starts substantively at step 50, where the game software 32 receives the player inputs. As discussed earlier, the player inputs are generated by the player operating the game pads, in particular buttons, joysticks and other control devices that are used to indicate desired motions or actions of the virtual game character. Signals from the game pads are input in the gaming device 12 and directed to the game software 32. While not shown explicitly in the flowchart, additional player inputs will also exist when the gaming device is used for playing multiplayer games. In such instance, in addition to the player inputs that are generated locally, the game software 32 will also be receiving game metrics, which inherently convey player inputs, from participating gaming devices.

At step 52, the game software 32 is executed to implement the game logic. The game logic is highly dependent on the particular type of game and scenario and it will not be described in detail. Suffice it to say that the game logic is the set of rules that determine an outcome based on player inputs.

At step 54 the game software 32 outputs rendering commands and game metrics. The rendering commands describe the virtual world of the game which is to be displayed to the local player. The rendering commands is the information that is supplied to the local rendering module 34 and processed to generate individual pixel values expressed in terms of color and intensity that compose the image the local player is to see. Generally, the rendering commands include instructions that tell the local rendering module 34 how to handle or manipulate geometry data. The geometry data constitutes a mathematical description of the various components of the virtual world scenes. An example of geometry data is vertex coordinates that define the location of the vertices making up the image mesh.

A simple example of a rendering command could be instructions to the GPU 26 to create a certain visual effect or a transformation to move a certain object in the image.

Note that the rendering commands may, in addition to the instructions convey the geometry data as well The rendering commands are passed to the rendering module 34 via its Application Programming Interface (API) 80 (shown in FIG. 2). DirectX or OpenGL are examples of APIs that can be used to by the game software 32 to interact with the GPU 26 of the rendering module 34, via a device driver 82.

As to the game metrics, as discussed earlier they represent in the context of the particular game which is being played, the actions of the virtual character associated with the game player such as motion of the character, actions being performed etc.

The rendering commands and the game metrics are two separate streams of information, which are directed to different components of the gaming device 12. The rendering commands are directed to the local rendering module 34 while the game metrics are output and are transmitted through the Internet to the game hosting server 16.

Figure 6:
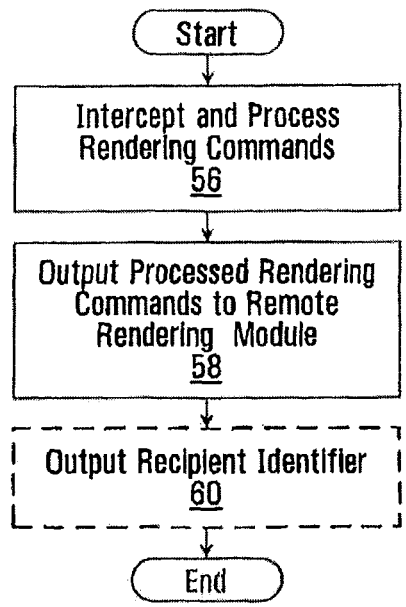
FIG. 6 is a flowchart of a process performed by the remote rendering controller of the gaming device shown in FIGS. 1 and 2.

FIG. 6 is a flowchart of the process performed by the remote rendering controller 36. At step 56, the remote rendering controller 36 intercepts and processes the rendering commands generated by the game software 32. The processing function can vary depending on the intended application and it can be as simple as dispatching the rendering commands to the remote rendering server 18. In most applications, however, a more substantive processing will be performed in order to more efficiently transmit the rendering commands. An example of such processing is to encode the rendering commands to reduce the amount of data that needs to be transmitted. Any suitable encoding process can be used without departing from the spirit of the invention. Such encoding is mostly effective with the rendering commands.

Another type of processing that can also be performed by the remote rendering controller 36 is to packetize the rendering commands such that they can be transmitted to the remote rendering server 18 over the Internet.

At step 58, the remote rendering controller 36 outputs the processed rendering commands to the output function 44 such that the rendering commands stream can be transmitted to the remote rendering server 18.

Step 60 is an optional step. The remote rendering controller 36 outputs the identifier of the recipient of the remotely rendered image stream, which typically would be a spectator. The identifier can be any type of identification data which can uniquely distinguish the spectator from other spectators. An example of such an identifier is the IP address of the terminal at which the spectator is located.

Figure 7:
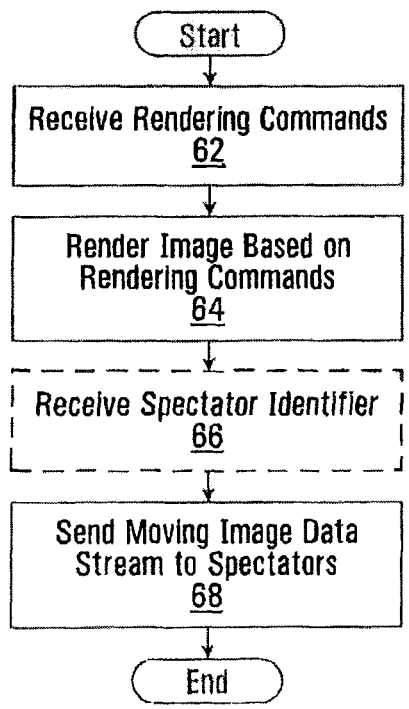
FIG. 7 is a flowchart of a process performed by the rendering module of the remote rendering server.

FIG. 7 is a flowchart of a process implemented by the rendering module 42 of the remote rendering server 18. The process starts at step 62 where the rendering commands from the gaming device 12 are input into the rendering module 42. This step assumes that initially the necessary processing has been performed on the data transmitted over the Internet in order to make it suitable for processing by the rendering module 42. Such processing may include decoding the rendering commands in the event they have been encoded prior to transmission.

At step 64, the image based on the rendering commands is rendered. The rendered output can be in any suitable format, the MPEG-4 format being one example. Step 66 is an optional step that describes the scenario where the gaming device 12 also sends the identifier of one or more spectators to which the game action stream is to be delivered. As indicated previously, the identifier can be the IP address of the terminal of the spectator. At step 68, the image data stream is sent to the spectators. The transmission would typically involve placing the individual video frames in suitable packets prior to transmission.

Figure 8:
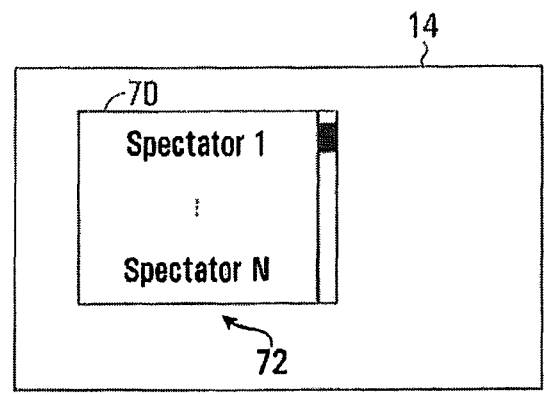
FIG. 8 illustrates the local display that is associated with the gaming device and shows a graphical user interface allowing the game player to identify a spectator to which the game action can be streamed.

FIG. 8 illustrates a graphical user interface that can be used by the local player at the gaming device 12 to select one or more spectators that are to receive the game action stream. This graphical user interface is generated and controlled by the game software 32 or the operating system running the console 12 and includes a control mechanism that presents the game player with a series of options among which the game player can select one or more spectators for receiving the game action stream. In a specific example of implementation, the game software 32 generates on the local display 14 the graphical user interface that includes a list 70 of spectators for selection by the local player. The list of spectators can be a static list in the sense that it would be pre-loaded by the player in the gaming device 12. This static list would include a series of entries where each entry is associated to an individual spectator. The spectators could be friends, relatives or acquaintances of the game player that may be interested to receive the game action feed when the player is playing the game. Each entry in the list includes a name for the respective spectator, which can be the real name of the person or pseudonym and also includes the identifier, such as the IP address of the terminal that is associated with the spectator.

Alternatively, other types of identifiers can be considered that can eventually be resolved into an IP address. For example, an email address can be specified.

Another possibility is to create a dynamic list that does not require the local player to manually input all the list entries. Such a dynamic list requires some sort of communication mechanism between the gaming console 12 and the spectator's terminal 20. For example, the gaming device 12 can send a request to a spectator terminal 20 to accept an invitation for a game action stream and if the spectator accepts the invitation, a response is sent to a gaming device 12 that is used to create an entry in the list that contains all the relevant information necessary to properly identify the spectator. The communication between the gaming device 12 and the spectator terminal 20 can be made by using email, text messaging etc.

To perform the spectator selection, the local player uses a pointing device 72 to designate one or more spectators in the list. The output of the selection is sent to the game software 32 and the associated spectator identifiers are sent to the remote rendering server 18, as previously described.

Figure 9:
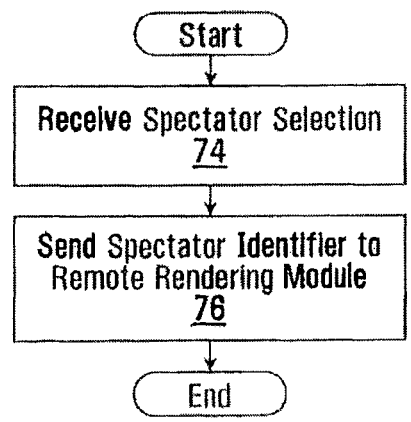
FIG. 9 is a flowchart illustrating the process for selecting the spectator to receive the game action stream by using the graphical user interface shown in FIG. 8.

FIG. 9 is a flowchart of the process for selecting one or more spectators that are to receive the video game action stream. At step 74, the selection of the spectator is received which is performed as described previously by using the graphical user interface. At step 76, the identifiers of the spectators so selected are sent to the remote rendering server 18.

In a possible variant, the remote rendering controller 36 is responsible for generating the GUI for performing the spectator selection. The remote rendering controller 40 "injects" in the flow of data directed to the local rendering module 34 the data necessary to generate the GUI on the display 14. Player interactions with the GUI on the display 14, such as selections of the spectators etc., are intercepted and directed to the remote rendering controller 36 for processing. In this fashion, neither the game software 32 nor the operating system of the gaming device 12 are involved with the spectator designation or selection process. The advantage of this form of implementation is that the game software 32 and the operating system of the gaming device 12 do not require modification to implement the spectator selection functionality. The remote rendering controller 36, which can be an add-on software module, performs all the necessary functions to provide access to spectators to the game action. Thus, a gaming device that originally has not been designed to provide spectator access to the gaming action can be upgraded with this feature by installing the software module implementing the remote rendering controller 36.

The description of the invention above was done in the context of a multi-player gaming device. Note that the invention applies equally well to a single player gaming device in which the game software is executed and generates rendering commands that are directed to the local rendering module in order to generate an image data stream for the game player to see. The single player gaming device would also include a remote rendering controller, identical to the remote rendering controller 36 which intercepts the rendering commands and transmits them to the remote rendering server 18. The only distinction with the multi-player gaming device is that no game metrics need to be output since the game logic is constrained to the local gaming device.

Also note that the remote rendering server 18 can work equally well with rendering instructions generated from a multi-player gaming device than rendering instructions generated from a single player gaming device.

Persons skilled in the art should appreciate that the above-discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

Those skilled in the art will also appreciate that additional adaptations and modifications of the described embodiments can be made. The scope of the invention, therefore, is not to be limited by the above description of specific embodiments but rather is defined by the claims attached hereto.

The invention claimed is:

1. A gaming device for playing a video game, the gaming device comprising:
   game software to output first rendering commands representing a virtual world of the video game;
   a local renderer for processing the first rendering commands to generate an image data stream of the virtual world;
   a remote rendering controller for generating second rendering commands for processing by a remote renderer to generate a rendered graphics output depicting the virtual world; and
   an output for:
      releasing the image data stream to a display; and
      transmitting the second rendering commands to a data communication network for transmission to the remote renderer,
   wherein the remote renderer generates the rendered graphics output using different software than the game software,
   the remote rendering controller injects data into a flow of data including the first rendering commands, the game software not being configured to inject the data,
   the data injected into the flow of data generates a graphical user interface, the graphical user interface being included in the image data stream released to the display and including a plurality of selectable identifiers,
   player interactions with the graphical user interface are intercepted and directed to the remote rendering controller, the player interactions including a selection of at least one of the selectable identifiers,
   the remote rendering controller outputs the second rendering commands for processing by the remote renderer to generate the rendered graphics output for at least one spectator corresponding to the selection of at least one of the selectable identifiers, and
   the remote rendering controller generates the second rendering commands and injects the data that generates the graphical user interface in parallel with the local renderer processing the first rendering commands.

2. A gaming device as defined in claim 1, wherein the first rendering commands include rendering instructions, the local renderer processing geometry data according to the rendering instructions to generate the image data stream.

3. A gaming device as defined in claim 2, wherein the geometry data include vertex data.

4. A gaming device as defined in claim 1, wherein the second rendering commands include rendering instructions, the remote renderer processing geometry data according to the rendering instructions to generate the rendered graphics output.

5. A gaming device as defined in claim 1, wherein the remote rendering controller encodes the second rendering commands for transmission to the remote renderer.

6. A gaming device as defined in claim 1, wherein the game software is a locally executed game software, the output transmits game metrics derived from the locally executed game software to the data communication network for transmission to a remote game hosting server aggregating game metrics from multiple remote gaming devices.

7. A gaming device as defined in claim 1, wherein the second rendering commands include data packetized for transmission to the remote renderer.

8. A gaming device as defined in claim 1, wherein the remote rendering controller generates identification information to identify one or more spectators to which an output of the remote renderer depicting the virtual world is to be sent via the data communication network.

9. A gaming device as defined in claim 1, further comprising:
a graphics processor configured to generate the graphical user interface on the display that displays the image data stream, the graphical user interface providing a player that plays the video game at the gaming device with a plurality of spectator selection options.

10. A gaming device as defined in claim 9, wherein the gaming device is responsive to selection of an option by the player via the graphical user interface to intercept and transmit, to the remote rendering controller, identification information associated with the option selected by the player.

11. A server arrangement for performing remote rendering of video game graphics, the server arrangement including:
an input for receiving:
second rendering commands transmitted to the input over a data network from a remote location, the second rendering commands being received from a remote rendering controller that injects data into a flow of data including first rendering commands, the data injected into the flow of data generating a graphical user interface on a display at the remote location, the graphical user interface including a plurality of selectable identifiers, player interactions with the graphical user interface being intercepted, the player interactions including a selection of at least one of the selectable identifiers, the second rendering commands a virtual world of a video game, the video game being played by at least one player executing game software and controlling a virtual character in the virtual world, the game software outputting the first rendering commands representing the virtual world of the video game, the game software not being configured to inject the data; and
identification information to identify one or more spectators, the identification information being based on the player interactions with the graphical user interface which are intercepted and include the selection of at least one of the selectable identifiers;
a renderer for processing the second rendering commands to generate an image data stream depicting the virtual world using different game software than as used at the remote location; and
an output for transmitting the image data stream to the at least one spectator over the data network corresponding to the identification information and the selection of at least one of the selectable identifiers, and
wherein the input receives the second rendering commands and the data that generates the graphical user interface is injected into the flow of data including the first rendering commands in parallel with a local renderer processing the first rendering commands.

12. A server arrangement as defined in claim 11, wherein the second rendering commands include rendering instructions, the renderer processing geometry data according to the rendering instructions to generate the image data stream.

13. A server arrangement as defined in claim 12, including a machine-readable storage for holding a list of identifiers of spectators that are to receive the image data stream.

14. A server arrangement as defined in claim 13, wherein, in response to reception of the identification information at the input, the server arrangement loads the identification information in the list.

15. A method for allowing a spectator to spectate a video game, the method including:
executing, by a central processor, game software to generate first rendering commands depicting a virtual world of a video game;
processing, with a local renderer, the first rendering commands to generate an image data stream of the virtual world;
generating, by a remote rendering controller, second rendering commands for processing by a remote renderer to generate a rendered graphics output depicting the virtual world; and
outputting the image data stream to a display device; and
wherein rendering commands include the first rendering commands and the second rendering commands derived from the first rendering commands,
the remote rendering controller injects data into a flow of data including the first rendering commands,
the second rendering commands are transmitted via a data network to a remote server for rendering and delivery of a rendered output to at least one spectator,
the remote server generates the rendered output using different software than the game software,
the game software is not configured to inject the data into the flow of data including the first rendering commands,
the data injected into the flow of data generates a graphical user interface, the graphical user interface being included in the image data stream output to the display device and including a plurality of selectable identifiers,
player interactions with the graphical user interface are intercepted and directed to the remote rendering controller, the player interactions including a selection of at least one of the selectable identifiers for determining the at least one spectator,
the remote server renders and delivers the rendered output to the at least one spectator corresponding to the selection of at least one of the selectable identifiers, and
the remote rendering controller generates the second rendering commands and injects the data that generates the graphical user interface in parallel with the local renderer processing the first rendering commands.

16. A method for performing distributed rendering of a video game, the method including:
- processing, at a first network node in a data network, first rendering commands depicting a virtual world of a video game with a first renderer to generate an image data stream for display to a player that executes game software and controls a virtual character in the video game;
- processing, at a second node in the data network that is remote from the first network node, second rendering commands, derived from the first rendering commands, with a second renderer to produce a rendered output depicting the virtual world and the virtual character of the player using different game software than as used in the first network node; and
- transmitting the rendered output to at least one spectator for viewing,
- wherein, at the second node, data is injected into a flow of data including the first rendering commands, the game software not being configured to inject the data,
- the data injected into the flow of data generates a graphical user interface, the graphical user interface being included in the image data stream displayed to the player and including a plurality of selectable identifiers,
- interactions of the player with the graphical user interface are intercepted and directed to the second node for determining the at least one spectator, the interactions including a selection of at least one of the selectable identifiers,
- the second node transmits the rendered output to the at least one spectator corresponding to the selection of at least one of the selectable identifiers, and
- the second node generates the second rendering commands and injects the data that generates the graphical user interface in parallel with the first network node processing the first rendering commands.

17. A machine readable storage medium encoded with non-transitory program code for execution by a central processor for generating rendering commands to perform remote rendering of video game scenes of a video game, the non-transitory program code including:
- remote rendering program instructions for processing first rendering commands output by game software for driving a local renderer, to derive second rendering commands for processing by a remote renderer to generate an image data stream of the video game scenes; and
- program instructions for transmitting the second rendering commands to a remote renderer over a data network,
- wherein the remote renderer generates the image data stream using different software than the game software,
- data is injected into a flow of data including the first rendering commands, the game software not being configured to inject the data,
- the data injected into the flow of data generates a graphical user interface, the graphical user interface configured to be displayed to a player that plays the video game and including a plurality of selectable identifiers,
- interactions of the player with the graphical user interface are intercepted and directed to the remote renderer, the interactions including a selection of at least one of the selectable identifiers,
- the remote rendering controller outputs the second rendering commands for processing by the remote renderer to generate the rendered graphics output for at least one spectator corresponding to the selection of at least one of the selectable identifiers, and
- the second rendering commands are derived and the data that generates the graphical user interface is injected into the flow of data including the first rendering commands in parallel with the processing of the first rendering commands.

18. A machine readable storage medium as defined in claim 17, wherein the non-transitory program code further includes:
- the graphical user interface is displayed on a display that displays an image data stream produced by the local renderer on a basis of the first rendering commands, the graphical user interface providing the player that plays the video game with a plurality of spectator selection options.

19. A machine readable storage medium as defined in claim 18, wherein the non-transitory program code further includes:
- the interactions of the player which are intercepted and directed to the remote renderer include a selection of one of the plurality of spectator selection options by the player, identification information being associated with the selection by the player.

20. A machine readable storage medium as defined in claim 19, wherein the identification information identifies at least one spectator to which the image data stream produced by the remote renderer is to be transmitted.

* * * * *